(12) United States Patent
Stein (10) Patent No.: US 6,772,929 B1
(45) Date of Patent: Aug. 10, 2004

(54) METHOD AND APPARATUS FOR CINCHING CARGO TO A VEHICLE CARRIER

(76) Inventor: John P. Stein, 14087 State Hwy. 15, Kimball, MN (US) 55353

( * ) Notice: Subject to any disclaimer, the term of this patent is extended or adjusted under 35 U.S.C. 154(b) by 163 days.

(21) Appl. No.: 10/075,068

(22) Filed: Feb. 12, 2002

Related U.S. Application Data (60) Provisional application No. 60/268,315, filed on Feb. 12, 2001.

(51) Int. Cl.$^7$ .............................. B60R 9/06; B60R 9/08
(52) U.S. Cl. ...................... 224/568; 224/455; 224/460; 224/534; 410/100
(58) Field of Search ................................ 224/324, 405, 224/455, 460, 534, 568; 414/462; 410/100

(56) References Cited

U.S. PATENT DOCUMENTS

| | | | |
|---|---|---|---|
| 1,013,863 A | | 1/1912 | Cronk |
| 1,713,238 A | | 5/1929 | Otte |
| 2,628,397 A | | 2/1953 | Olson |
| 2,988,253 A | * | 6/1961 | Menghi ...................... 224/324 |
| 3,039,634 A | * | 6/1962 | Hobson et al. ............. 414/462 |
| 3,279,759 A | | 10/1966 | Tallman |
| 3,437,248 A | | 4/1969 | Allen |
| 4,011,974 A | | 3/1977 | Scarola |
| 4,077,554 A | | 3/1978 | Goode |
| 4,174,119 A | | 11/1979 | Biles |
| 4,223,869 A | | 9/1980 | Patterson, III et al. |
| 4,314,783 A | | 2/1982 | Parnell et al. |
| 4,406,384 A | | 9/1983 | Schantz |
| 4,420,105 A | * | 12/1983 | Nepper ....................... 224/328 |
| 4,450,989 A | * | 5/1984 | Bogar, Jr. ................... 224/568 |
| 4,464,089 A | | 8/1984 | Allen |
| 4,473,178 A | * | 9/1984 | Bott ........................... 224/324 |
| 4,487,537 A | | 12/1984 | Morse |
| 4,510,652 A | | 4/1985 | van Iperen |
| 4,630,990 A | * | 12/1986 | Whiting ...................... 414/462 |
| 4,676,414 A | | 6/1987 | Deguevara |
| 4,681,247 A | * | 7/1987 | Prosen ........................ 224/324 |
| 4,900,203 A | | 2/1990 | Pope |
| D308,846 S | | 6/1990 | Eckhart |
| 4,954,030 A | * | 9/1990 | Szucs et al. ................ 224/405 |
| 5,165,815 A | | 11/1992 | Allen |
| 5,219,105 A | | 6/1993 | Kravitz |
| 5,282,555 A | | 2/1994 | Muir et al. |
| 5,316,192 A | | 5/1994 | Ng |
| 5,338,136 A | | 8/1994 | Hetchler |
| 5,377,885 A | | 1/1995 | Wyers |
| 5,385,435 A | | 1/1995 | Musta |
| 5,435,472 A | | 7/1995 | Allen et al. |
| 5,469,997 A | | 11/1995 | Carlson |
| 5,476,202 A | | 12/1995 | Lipp |
| 5,598,960 A | | 2/1997 | Allen et al. |
| 5,623,750 A | * | 4/1997 | Nasin et al. ................ 224/318 |
| 5,645,202 A | | 7/1997 | Kaloustian |
| 5,941,666 A | | 8/1999 | Waters |
| 6,010,049 A | | 1/2000 | Stein |
| 6,010,143 A | | 1/2000 | Stein |
| 6,039,228 A | | 3/2000 | Stein et al. |
| 6,059,498 A | | 5/2000 | Ostrowski |
| 6,199,412 B1 | * | 3/2001 | Kennedy .................... 224/568 |
| 6,203,259 B1 | | 3/2001 | Christensen |
| 6,299,396 B1 | | 10/2001 | Chasen |
| 6,322,304 B1 | | 11/2001 | Chasen |

* cited by examiner

Primary Examiner—Gary E. Elkins
(74) Attorney, Agent, or Firm—Albert W. Watkins (57) ABSTRACT

A cargo carrier is readily configured to transport bicycles, skis and poles, snowboards, canoe paddles and other cargo through the use of a vertical frame into which various rods may be placed, at locations most suited for the specific cargo. One or more of the rods includes a strap and buckle which allows the strap to be adjusted for length. Intermediary along the strap various rings and spacers may be located to slidably engage both cargo and carrier. In use, the strap is used to encircle cargo and is held adjacent a support through a sliding retainer which is slipped onto the carrier. Prior to assembly of the carrier, the few components of the carrier are relatively two dimensional, so the carrier may be packaged, stocked and sold in compact, flat packaging.

19 Claims, 5 Drawing Sheets

METHOD AND APPARATUS FOR CINCHING CARGO TO A VEHICLE CARRIER

CROSS REFERENCE TO RELATED APPLICATIONS

This application claims priority to Untied States provisional patent application Ser. No. 60/268,315 filed Feb. 12, 2001 and entitled "Method and Apparatus for Cinching Cargo to a Support", the contents which are incorporated herein by reference in entirety.

BACKGROUND OF THE INVENTION

1. Field of the Invention

This invention pertains to article carriers generally, and particularly to tie-downs and methods of anchoring cargo on multi-purpose ski and bicycle carriers that either directly engage or otherwise couple with a vehicle towing component.

2. Description of the Related Art

Passenger vehicles are well adapted to transport people, as they were designed to do, and will readily transport small cargo such as grocery sacks and briefcases. During outings, however, such as week-end trips, vacations or competitions, other modes of transportation are often desired. Skis, snowboards or bicycles may be integral to the outing. The recreational enthusiast knows the value of quiet leisure away from the hustle and bustle of the city, but must somehow find a way to carry both passengers and additional transportation equipment to the place of leisure. The competitor must get to and from the competitions, and will want to preserve the equipment for competition.

The method of transporting equipment should not detract from the goal of the outing, be it leisure or competition, nor should it cause any damage to a passenger vehicle. Unfortunately, in the past these simple goals have been contrary to each other.

A multitude of roof-top racks and carriers have been designed for either permanent or temporary mounting. These carriers are usually designed and manufactured to be compatible with one or a limited number of vehicles, since each vehicle is sized and shaped uniquely. While the permanent variety usually are more reliable in load carrying, they are also usually installed at the factory to carefully control installation and thereby prevent any leakage or damage which might otherwise occur. Moreover, they permanently add to the size of the vehicle, and also generally detract from the vehicle's appearance.

Temporary carriers have been designed from diverse materials and geometries, including materials such as foam block, foam pad, rubber, plastic, metal and wood. To reduce the inventory required by a vendor to sell the temporary carrier, common vehicle features are used to attempt to provide the necessary support for cargo. For example, gutters are often found around vehicle doors, and a number of carriers clamp onto these gutters. Unfortunately, not all vehicles have features such as gutters, and so several different carriers must still be designed. Other carriers rely on the roof of the vehicle to provide both load bearing and also a place for friction, suction or magnetic grab. These temporary carriers have a tendency to be more temporary than planned or desired, occasionally allowing the cargo to slip and either be damaged or damage the vehicle. Such an event is totally unacceptable and will render a carrier useless.

In addition to the other challenges, roof-top carriers present an obstacle during loading and unloading. The equipment must somehow be placed on top of the vehicle without damaging either the vehicle or the equipment. Yet, the reason the equipment is being placed on top of the vehicle is because of large size and/or great bulk.

Other prior art carriers have been designed to mount on the bumper of a vehicle. While this type of carrier is often easier to load and unload, the limitations related to different vehicle designs found with the roof top carriers are still present. Different vehicles have different bumper designs. Some of the most modern vehicles offer no access to the bumper at all, and so different carriers must still be designed and stocked to accommodate different vehicles.

Given the limitations of the prior art, it is not surprising that there has been a relative explosion in carriers designed to install directly into a hitch receiver. The hitch receiver acts as a universal coupling into which utility and boat trailers may be attached, and may also be used to support a carrier. Like the bumper carrier, a hitch receiver carrier provides the advantage of easy equipment loading. In addition, hitch receivers have become standard to two sizes. The large size, a two inch receiver, is designed for high loads and may be specified, for example, for trailers as large as 3,500 pounds and tongue weights as great as 350 pounds. For smaller loads, typically up to 2,000 pounds and tongue weights of 200 pounds, a one and one-quarter inch hitch receiver is used.

While the hitch receiver designs have vastly eased the problems of different vehicle designs, there are still limitations therein that manufacturers have not been able to satisfactorily address. One limitation is the variability of equipment a user will transport. Some manufacturers have addressed each different type of equipment with different add-on components which adapt the carrier to the particular equipment. Unfortunately, a store then has to stock each of the different components. The user will also have to store all of the unused components, and remember the intended purpose of each of the components. Obviously, making the carrier adaptable to a variety of cargo is an expensive proposition for all involved, and is therefore undesirable when such add-ons are required. Finding a method to fasten various items securely to a multi-purpose carrier can be challenging, and the methods of the prior art can be quite time-consuming and provide less than desirable performance.

Another problem with hitch receiver carriers is when they support relatively large loads. The carrier is on a long arm extending from the receiver. When acceleration occurs in a vertical direction, the receiver is carrying the load exactly as it was designed for. Unfortunately, events such as acceleration, bumps and cornering lead to forces which are not always directly vertical. Particularly with the long vertical arm, forces transverse to the vehicle are amplified at the hitch. The carrier may sway or pivot undesirably within the receiver. Furthermore, even with purely vertical forces, the carrier may rattle or chatter within the receiver. Finally, there are two different standard receiver sizes that must be accommodated.

Some prior art carriers are illustrated in U.S. Pat. No. 3,437,248 to Allen, U.S. Pat. No. 4,406,384 to Schantz, U.S. Pat. No. 4,676,414 to Deguevara, Des. U.S. Pat. No. 308,846 to Eckhart, U.S. Pat. No. 5,219,105 by Kravitz, U.S. Pat. No. 5,435,472 and U.S. Pat. No. 5,598,960 to Allen et al, U.S. Pat. No. 5,469,997 to Carlson, U.S. Pat. No. 5,476,202 to Lipp, and U.S. Pat. No. 5,645,202 by Kaloustian, the contents and teachings of each incorporated herein by reference. The Allen U.S. Pat. No. 3,437,248 was one of the early patents which showed a multi-purpose carrier that included bicycle, ski and roof-top capability. Like many of the other subsequent patents, however, the Allen design is limited to one or two bicycles, provided the bicycles are of the right design, or, alternatively, two pairs of skis. Bicycles of unusual design, or other objects aside from the skis, are not as easily accommodated, nor are multiples of bicycles and skis. Furthermore, in the Allen patent and in many other similar designs, the carrier must be tilted significantly towards the vehicle in order to retain cargo during transit. This significant tilting results in substantial load being placed against vehicle body panels and components. The risk of damage from the weight of the cargo and carrier, or from movement that leads to undesired contact between cargo and vehicle or motion between vehicle and carrier will lead to very expensive damage to the vehicle. This risk is not justifiable when the cost of repair is much greater than the cost of a carrier, as it generally is.

Schantz discloses a bumper mounted carrier that includes a cargo area behind the vehicle and also on the roof-top. The Schantz design does not include adaptations for any particular type of load, but does illustrate a dual platform carrier. The Schantz patent is exemplary of prior art carriers that are quite complex for carrying diverse cargo.

Deguevara illustrates a receiver mounted bicycle carrier, with a separate attachment for carrying skis. The Deguevara patent illustrates some of the fundamental limitations discussed previously. The carrier is limited to a predetermined number and type of bicycles, two as illustrated, and requires additional hardware, purchased separately, to accommodate skis. Other equipment would require yet more hardware, with each unique cargo item potentially requiring a unique attachment. Obviously, this is not practical for carrying diverse cargo, particularly when the different cargo types are carried upon the same carrier at the same time.

Eckhart discloses an elegantly simple bicycle carrier using rods that are inserted using cotter pins. Unfortunately, no provisions are made for other types of cargo aside from bicycles, nor are there any provisions for retaining cargo thereon. Carlson discloses a different, yet also well devised, bicycle carrier. Unfortunately, like the Eckhart design, no provisions are made for other cargo, and there is only very limited, and yet costly, structure for retaining cargo in place. Kravitz, Allen et al in U.S. Pat. No. 5,435,472 and U.S. Pat. No. 5,598,960 and Kaloustian each also disclose prior art carriers with laterally extending arms.

Lipp discloses a bicycle and ski carrier which is capable of transporting several pairs of skis or bicycles without requiring separate add-on components, but the Lipp design is limited to carrying one type of cargo at a time, wherein the cargo must be consistent. In other words, either skis all having the same approximate thickness or bicycles having frame pieces of approximately the same [di]ameter and having appropriate shape and dimension will fit onto the carrier, but not both simultaneously.

The prior art limitations on adaptability are particularly apparent when a larger number of bicycles are desirably transported, particularly when those bicycles may include racing bicycles, bicycles without a top bar between seat and handle bars, and bicycles which may not have openings within the frame structure at all. The larger three-wheeled recumbent bicycles are also not transportable using these prior art carriers. Other difficult combinations include various assortments such as skis and bicycles or other combinations of diverse equipment.

In my previous patents U.S. Pat. Nos. 6,010,043, 6,010,049 and 6,039,228 and my presently allowed co-pending patent application Ser. No. 09/443,187 filed Nov. 19, 1999, the entire contents of each incorporated herein by reference, carriers are disclosed which have removable load-supporting pins. The pins are easily reconfigurable, which allows the carriers to be adapted to a variety of different loads. Nevertheless, there is still a desire for a further improved apparatus and method for securely supporting diverse loads upon a carrier, and for securely supporting cargo upon a carrier coupled with a vehicle towing component. For the purposes of this disclosure, vehicle towing components will be understood to include trailer type receiver hitches, bumper mounts, trunk mounts and other structure which carries a load and follows the general travel of a vehicle.

SUMMARY OF THE INVENTION

In a first manifestation, the invention is a cargo carrier having a structural framework operatively coupled with a vehicle towing component and having a load support extending therefrom for supporting cargo during transit. The improvement comprises a flaccid indeterminate length strap; a buckle which the strap passes through that retains tension when the strap is operatively cinched against cargo; and a guide coupled with and moveable relative to the load support and also operatively coupled to the strap. The guide has tensile forces applied to it between the load support and strap when the strap is cinched against cargo.

In a second manifestation, the invention is a cargo retainer for retaining at least one cargo item. A longitudinally extensive support surface terminates in an unsupported end, and a flexible and tensionable retainer runs co-extensive therewith and spaced therefrom to accommodate at least one cargo item therebetween. A first means for retaining a portion of the retainer adjacent a portion of the support surface is moveable along an axis parallel to the direction of longitudinal extension of the support surface, to vary the location of the support surface that is adjacent the portion of the retainer.

In a third manifestation, the invention is a convertible cargo carrier having a generally upright member and at least one laterally extending support arm configured to support at least one diverse load. Included are a means for passing from the support arm about the load which conforms generally thereto, and a means for tensioning the passing and conforming means. First and second alternative mounts locate the support arm relative to the upright member. First and second alternative anchors locate the passing and conforming means relative to the upright member. The first alternative anchor is adjacent the first alternative mount and the second alternative anchor is adjacent the second alternative mount. The passing and conforming means and support arm may be moved as a pair relative to the upright member between two alternative positions.

These and other features and manifestations are further detailed herein below.

OBJECTS OF THE INVENTION

Exemplary embodiments of the present invention solve inadequacies of the prior art by providing an adjustable strap which acts upon cargo and the pins or rods of prior art carriers to cinch the cargo tightly against carrier. Various embodiments provide different advantages and benefits, as will be apparent to those skilled in the art upon a review of the present disclosure, and are provided herein merely to illustrate the possibilities of the present invention.

A first object of the present invention is to provide an adaptable carrier which can accommodate very diverse articles simultaneously, including bicycles of all types, skis and poles, and many other articles, without requiring separate apparatus for each type of article. A second object of the invention is to be able to secure these diverse articles tightly onto the carrier to prevent any load shifting or undesired movement. Another object is to be able to load and unload these diverse articles without risk of damage to vehicle or articles. A further object is to use components which are readily re-usable, and which simultaneously allow the carrier to be shipped in relatively flat and compact packaging cartons prior to resale. Yet another object of the present invention is to utilize standard components wherever possible, thereby reducing the need for a large number of custom components and associated higher cost. Yet a further object of the invention is to provide an apparatus and method for securing articles onto a carrier which is natural and intuitive. An additional object is to enable reconfiguration without the need for a large number of small, easily misplaced parts. Another object of the invention is to keep the carrier as strong as possible while still keeping weight to a minimum.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 5 illustrates a preferred spacer for use with the preferred embodiment, while

To keep the drawings as legible as possible, while still clearly identifying unique features, identical features have not been renumbered in the figures subsequent to FIG. 1, except for reference and bearing purpose, and will be understood to be the same as those of FIG. 1.

DESCRIPTION OF THE PREFER RED EMBODIMENT

Figure 1:
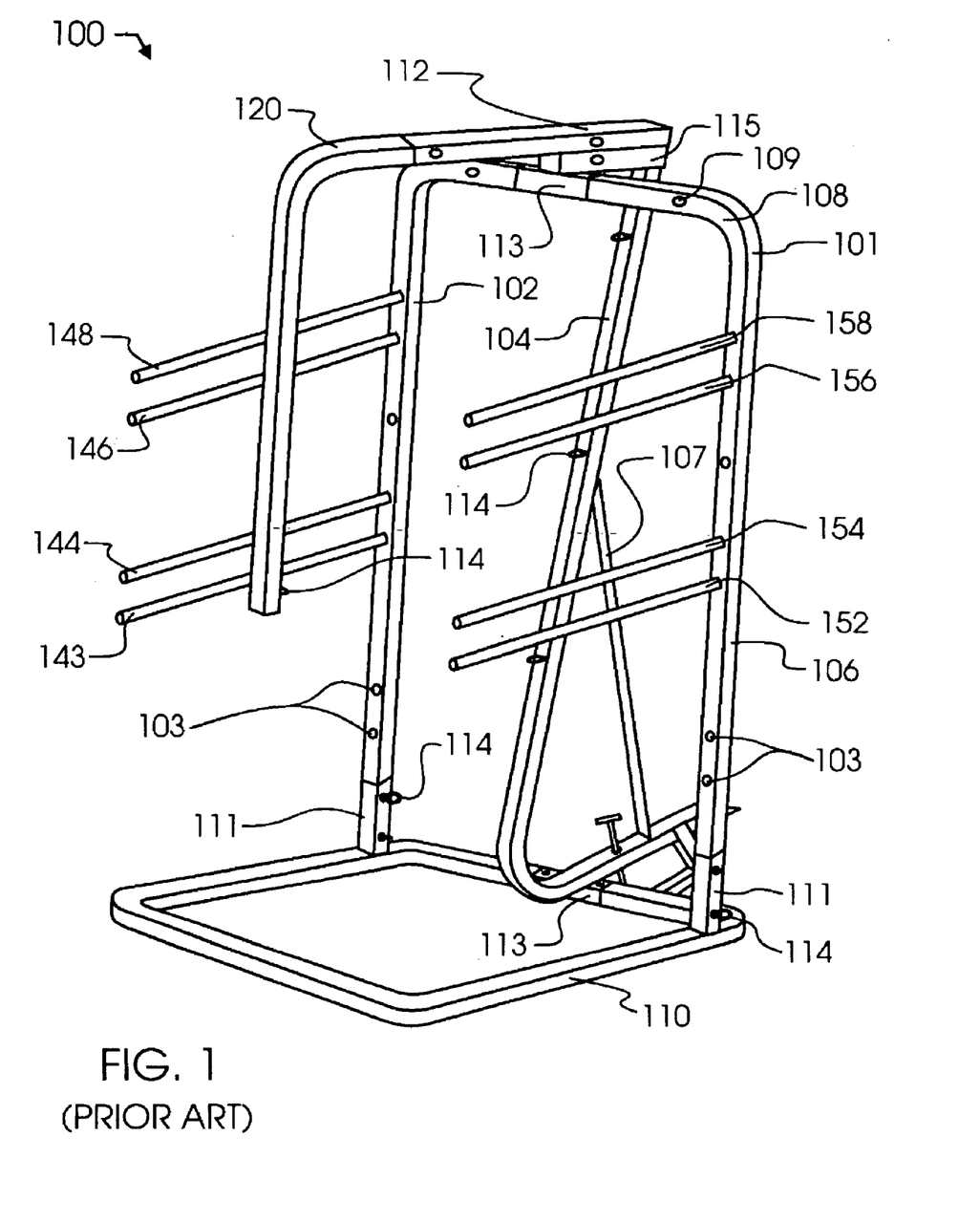
FIG. 1 illustrates a prior art carrier configured to carry snowboards, skis or other similar objects, from a projected view.

Carrier 100 illustrated in prior art FIG. 1 is of the type described in my U.S. Pat. No. 6,039,228 incorporated by reference in entirety herein above. This type of carrier is most preferred for combination with the remaining inventive features, owing to features and advantages which are not available in other carriers. Nevertheless, those skilled in the art will understand that the preferred embodiment cinch strap may also be used with other carriers and other pins and is not strictly limited to the full and identical features and components of carrier 100. Exemplary, though less preferred, alternative carriers include Allen, Deguevara, Carlson, Lipp and Eckhart referenced herein above, though the invention extends well beyond these specific carriers. In a most preferred embodiment of the invention, carrier 100 will include laterally extending arms, rods, tubes or the like, typically designed to act as load supporting members, such as are illustrated in the aforementioned patents and herein in FIG. 1.

In the illustration of FIG. 1, Carrier 100 is comprised by a U-shaped tube 101 having two major vertical struts 102 and 106. Vertical struts 102 and 106 have a number of holes 103 therethrough, extending longitudinally parallel with hitch 105. Six holes 103 are illustrated on each of struts 102 and 106, but the exact number, placement and orientation of holes 103 is not critical to the invention. Preferably, an assortment of holes 103 will be provided sufficient to enable carrier 100 to adequately support a large number of articles including, but not limited to, bicycles, skis, snowboards, and other recreational and utilitarian devices.

Figure 2:
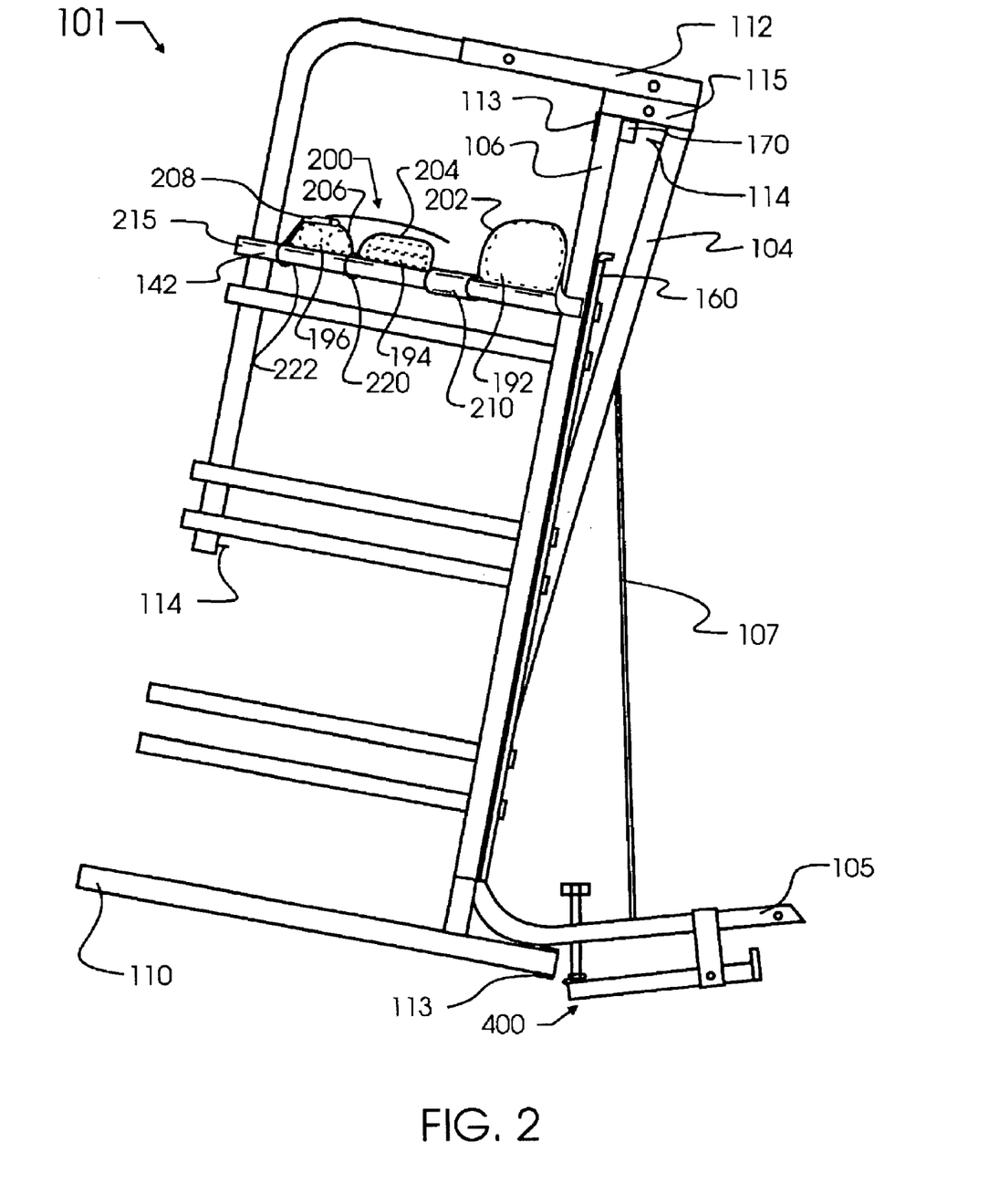
FIG. 2 illustrates a preferred embodiment carrier designed in accord with the teachings of the present invention, configured to carry snowboards, skis or other similar objects, from a side view.

Extending between vertical struts 102 and 106 on U-shaped tube 101 is horizontal strut 108. Horizontal strut 108 also has holes 109 therein, preferably similar to holes 103. Attached at the base 1of vertical struts 102, 106 is rectangular base 110, which is preferably formed from a single piece of tubing by forming four bends therein. Base 110 has two three-sided channels 111 welded onto base 110 to mate with the ends of U-shaped tube 101. In addition to channels 111, another three-sided channel 113 attaches base 110 to z-strut 104. Through channels 111 and 113, base 110 can be rigidly attached to U-shaped tube 101, while still allowing removal therefrom for shipping purposes. As is known in the industry, shipping carriers place particular constraints upon the dimensions a package may take. By using channels 111 and 113, base 110 may be laid flat with tube 101 during shipping and then may be assembled thereto in a more perpendicular manner during use as shown in FIGS. 1 and 2.

Midway between vertical struts 102 and 106 is vertical z-shaped strut 104. At the top of z-strut 104, above horizontal strut 108, is receiver 115. Receiver 115 may be permanently welded to z-strut 104 if desired. On top of receiver 115 is second receiver 112 which extends much farther from z-strut 104 than receiver 115. Z-strut 104 will preferably be releasably attached to U-shaped tube 101 through three-sided channel 113. Once again, this allows z-strut 104 to be released from U-shaped tube 101, so that z-strut 104 may be laid flat inside a package to conform to shipping constraints. While the particular shape of strut 104 is not critical, the combination of vertical support brace 107 and the z-shape of strut 104 provide substantial strength and resistance to fatiguing, while also providing a unique and aesthetically pleasing appearance. In addition, and as is best visible in FIG. 2, vertical strut 106 is tilted slightly from vertical, approximately fifteen degrees from vertical. The slight tilt helps to support the load prior to strapping, while also moving the load closer to the hitch. Since the amount of torque generated is calculated by the weight of the load multiplied by the distance of the load from the pivot point, bringing the load closer to the receiver hitch reduces the amount of torque generated at the hitch during vehicular movement over bumps and the like. Furthermore, the slight angle helps to bring the end of base 110 distal from hitch 105 farther off of the ground, to help prevent carrier 100 from dragging when a vehicle travels over a roadway with a sudden change in inclination. For the purposes of the present disclosure, this angle change is still within a range considered to be primarily vertical, which could be as great as forty-four degrees from vertical, and rods 142–158 discussed hereinbelow are still considered to be primarily horizontal.

The combination of vertical struts 102, 106, z-strut 104, horizontal strut 108, rectangular base 110 and receiver 112 form the basic frame of carrier 100, from which a number of variations of carrier configurations are possible. Several additional components are added and moved around about this basic framework, depending upon the cargo to be carried. By virtue of the basic frame being flat and the other components being removable and relatively two dimensional, carriers in accord with the present invention may be packaged for shipping, stocking and resale in a flat, compact package.

At various locations along struts 102, 104, 106, 108, 110 eye bolts 114 are placed, to allow tie straps, bungee cords, ropes or similar retaining devices to be used to assist in retaining cargo. While eye bolts 114 are illustrated, they are not critical to the invention and other known attachment points or retaining methods may be used.

While not absolutely critical to the invention, the basic materials used in the preferred embodiment are square steel tubes. These tubes offer low cost, low weight, ready machinability and high strength, while the square geometry prevents unwanted spinning or rotation between different sections of tubing. Moreover, the flat surfaces of square tubing ensure ready placements and alignments that are not available with round tubing. For example, with round tubing, aligning holes through which a pin must pass can be vexing. When a designer elects to change materials, the attachment methods referred to throughout the specification will need to be adapted according to the characteristics of the new materials, as is known generally. As configured in FIG. 1, rods 143–148 and rods 152–158 are inserted through holes 103 and retained therein.

As is partially visible in FIG. 2, sliding keyhole bracket 160 is provided on the back side of both vertical strut 102 and vertical strut 106. Sliding keyhole bracket 170, also partially visible in FIG. 2, is provided on the back side of horizontal strut section 108. The attachment between brackets 160, 170 and U-tube 101 is not a rigid attachment, but rather a snug, but slidable interrelationship. To ensure a smoother sliding motion between bracket 160 and U-tube 101, while still ensuring a solid mounting therebetween, additional anti-friction material may be provided for and between brackets 160, 170 and U-tube 101.

Rods 143–148 do not need to be inserted into exactly corresponding holes 103 as rods 152–158 are inserted into. As shown in FIG. 1, rods 143–148 are inserted into holes 103 at the same heights as rods 152–158. However, the particular holes 103, 109 used will depend upon the particular cargo to be carried.

Additional cargo securement may be provided by attaching additional locking frames. A smaller square tube 120 is illustrated as inserted into receiver 112 in FIGS. 1 and 2. This square tube 120 serves to enclose larger cargo supported from rods 143–158, such as bicycles, thereby preventing removal therefrom. The actual length of tube 120 is not critical to the invention, and may extend partially as illustrated or may, for example, extend down to base 110. On an inner surface of tube 120, an additional eye-bolt or D-ring is shown, though holes can be used alternatively. The use of this particular anchor point offers unique advantage in preventing any rattling of tube 120 within receiver 112 during transport. Tube 120 may alternatively be inserted into receiver 115, particularly when the load to be carried is much smaller.

Hitch 105 is shown by illustration in FIG. 2 to have an angled leading edge for insertion into a vehicle receiver. This was found to simplify installation therein, though the actual angle is not critical and in the preferred embodiment an angle of only five degrees is used. Hitch receiver lock 400, which in the preferred embodiment is integrally mounted to hitch 105, is used to prevent relative motion between a hitch receiver and carriers such as carrier 100. A similar suitable lock is illustrated in my U.S. Pat. No. 6,010,143, the contents and teachings which are incorporated completely herein by reference. Lock 400 multiplies clamping forces, making it relatively easy for a person to very securely clamp down and lock hitch 105 to a standard receiver.

As will be readily understood from the easy hitch removal and self-supporting nature of carrier 100, rather than having to separately remove all of the cargo, the entire carrier 100 may be used as a storage center, and be ready to transport for the next outing. This is a distinct advantage in the marketplace, since carriers typically detract from the aesthetic appearance of the vehicle and are desirably removed when not in use. Most prior art carriers are not free standing and must be disassembled at least partially during removal or after removal for storage. The cargo must be removed. To prepare for the next outing the entire process must be reversed. Carriers designed in accord with the present invention are simply slid off of the receiver hitch and stored, ready for re-use another time without any further disassembly or unpacking. Particularly for those persons seeking leisure, this is a distinct advantage.

Preferred embodiment carrier 101 is illustrated in FIG. 2. As is apparent therein, pin 158 of FIG. 1 has been replaced by pin 142. While the construction of the two pins per se may not be materially different, the different numbering is used herein to more clearly distinguish the present invention from the prior art. In fact, pin 142 will most preferably be interchangeable for any or all of pins 143–158. Pin 142 is one such as illustrated in my previously granted patents U.S. Pat. Nos. 6,010,049 and 6,039,228, and my presently allowed co-pending application Ser. No. 09/443,187 filed Nov. 19, 1999 and co-pending herewith, each of these documents already incorporated herein by reference in their entirety for their teachings regarding the application of pins to carriers. The pin does not have to be as illustrated in those patents, but in fact can take on most any dimension and geometry. Most preferably however, due to cost, ease of manufacture, and adaptability, the straight, cylindrical pin 142 illustrated is used.

Pin 142 is directly associated with a strap 200. Materials contemplated herein for strap 200 include fabric strapping or other flaccid or flexible material of indeterminate length; the various cabling materials, including those which are resistant to severing or cutting and which may therefore offer additional locking or securing capability to safely retain and secure cargo; cord; ropes; webbing; and other materials, so long as the materials provide sufficient weather resistance and strength for an intended application. Additionally, to accommodate readily damaged or expensive cargo, materials which are recognized as soft or non-marring, and even materials, straps or webs which provide elasticity may be used herein. A strap that works well for the preferred embodiment is a polypropylene webbed strap.

Encircling strap 200 and most preferably slidable relative thereto are any number and combination of spacers 210 and rings 220. Most preferably, there will be at least one or more of either spacers 210 and rings 220 used in association with strap 200. Strap 200 will most preferably pass interior of or engage with spacers 210 and rings 220, and spacers 210 and rings 220 will engage and most preferably slide relative to pin 142. By virtue of the trapping of strap 200 adjacent pin 142 at each of spacers 210 and rings 220, strap 200 can readily be made to encircle cargo of very diverse dimension and geometry, by forming loops 202, 204, 206 about cargo 192, 194, 196, respectively.

Spacers 210 may be manufactured from many diverse materials, as may rings 220 as used in the present invention. Extrusions of plastic or metal tend to offer somewhat lower costs, and materials such as nylon that are strong, unbreakable and very weather resistant are preferred. In one embodiment, chrome plated steel is contemplated for rings 220 and white PVC plastic is contemplated for spacers 210.

Where a fully flaccid material is used for strap 200, there is essentially no limit to the geometry of cargo that may be accommodated. In addition to skis, bicycles, ski poles, lumber, canoes, surf boards, wind surfers, kayaks, and snowboards are items of any size and geometry that can be accommodated upon rods such as rod 142. While spacers 210 may most commonly be used as a part of the guiding path for strap 200, such as is clearly visible in FIG. 2, for example, spacers 210 may be used separately from rings 220 to strictly serve as a spacer, without passing strap 200 therethrough.

While rods 142 are most preferably cylindrical, owing to relatively low cost and ready availability, there is no requirement that these rods even have the shape of a rod. The longitudinally extensive nature and load supporting capability are most preferred, and structures include square or other tubing or solid material may be used, as may longitudinally extensive arms of other geometries similar to those illustrated in the prior art discussed herein above and otherwise known or available to those skilled in the art. While spacers 210 and rings 220 may be relatively small as illustrated, they may also be considerably larger than pin 142. Preferably the item being fastened is taller than spacers 210 and rings 220 to allow strap 200 to better encircle the item.

At the end of strap 200 adjacent vertical strut 106, strap 200 will preferably be anchored. This may be accomplished by tying strap 200 in a loop about vertical strut 106. Most preferably, the fastening means or technique is removable to allow strap 200 to be moved with rod 142. At an end of rod 142 distal to vertical strut 106 is a ring 222 which is similar in purpose and function to rings 220, except that ring 222 is used to retain a first end of anchor stub 207 adjacent rod 142. Anchor stub 207 in the preferred embodiment may be manufactured from materials similar to strap 200 or different therefrom. While a ring 222, flaccid anchor stub 207 and buckle 208 are illustrated, one skilled in the art will recognize that most any device which is capable of being retained adjacent rod 142, which will most preferably slide along the longitudinal axis of rod 142, and which will allow strap 200 to be tightened may be used in the working of the present invention. In the preferred embodiment, a cam buckle serving as buckle 208 in association with a polypropylene webbed strap 200 serves the desired functions.

Although some cargo items can be carried with one pin 142 and strap 200, most items will require two pins and straps. Three or more pins and straps can be added to carry more items, or keep items such as bicycles separated to prevent damage. In the preferred embodiment carrier 101, a plurality of pins 142 may be used in many different configurations. However, the pins 142 and straps 200 work very well on much simpler carriers having only one or two pins or equivalent longitudinally extensive structures.

Ways to separate bicycles and other cargo on carrier 101 include, but are not limited to: using spacers 210 to space the bicycles and tying the pedals together to prevent swaying into one another; cinching a fun noodle, pipe wrap or other padding with one end of the padding attached to each of two pins that a bicycle spans and between bicycles; or hanging padding from each pin to space the bicycles. To provide spacing between the pedal portion of bicycles or other cargo, it may also be desired to provide a fun noodle or foam extrusion that forms an inverted arch, with both ends secured to the pins. This foam extrusion may have holes at each end for slipping directly onto the pins, or may alternatively be cinched onto pins 142 along with the cargo. If separating bicycles or other cargo is not an issue, several bicycles could be secured to the carrier by using only one ring such as ring 222 in association with strap 200, though some advantages of the present invention will be lost with such an alternative and consequently less desirable arrangement.

While the preferred embodiment illustrates a strap extending longitudinally from one end of rod 142 to the other, and preferably well beyond, in a contemplated alternative embodiment it is possible to start and end the strap adjacent one end of pin 142, such as adjacent vertical strut 106. In this case, the strap 200 should be more than two times the length of pin 142. This allows rings 220 or spacers 210 to remain on strap 200 at all times, eliminating the possibility of misplacing them. The buckle end, which in this embodiment may preferably be a spring buckle, is secured to vertical strut 106 or other frame member so strap 200 tightens rather than turns when pulled. Rings 220 will most preferably be as close to the size of pin 142 as possible, yet with enough room for strap 200 to pass through. This ensures strap 200 will fully secure the cargo rather than having ring 220 contact the item. This is a benefit, since strap 200 will in most designs be less damaging to a cargo item than ring 220.

Using this alternative embodiment to fasten cargo to a carrier may, for example, include taking the end of strap 200 away from buckle 208, running it over the top of carrier 101 along side pin 142, through the front slot in buckle 208, and down through the back slot in buckle 208. The looping through buckle 208 will depend upon the exact construction and style selected, as is known in the art. Then strap 200 is pulled tight so buckle 208is strapped to the top of carrier 101. The desired number of rings 220 and spacers 210 are next placed in the order preferred on strap 200 by running the loose end through each. The spacer 210 or ring 220 that is intended to be closest to vertical strut 106 should be placed first. Then the loose end of strap 200 is passed through buckle 208. Next, the first ring or spacer is slid over pin 142 and tightened against carrier 101, so the bottom of the now-formed loop 202 is between the top of pin 142 and the ring or spacer. Any excess loop of strap, rings and spacers may be hung between the vehicle and frame. The process is repeated for second and subsequent pins 142 as required or desired. Carrier 101 is ready to load.

To load carrier 101, cargo such as cargo 192 is placed on at least one pin 142. A loop of strap such as strap 202 is placed over cargo 192, and then the next ring, spacer or spacers are slid over the end of pin 142 and pulled tight against the cargo item. Then strap 200 is pulled tight between the ring and pin. Any loose loop of strap, excess rings and spacers or the like may be left to hang between the vehicle and frame. The next cargo item such as cargo 194 is then placed on pin 142. A loop of strap 200 is passed over cargo 194, and then the next ring, spacer or spacers is slid over pin 142 tight against cargo 194. Strap 200 is preferably pulled tight once again. After tightening strap 200 on the last item, any remaining rings or spacers may be slid onto pin 142 and strap 200 is tightened at buckle 208. To remove items, the process is reversed. When there are no items on the carrier, rings 220 and spacers 210 may be slid onto pin 142 and strap 200 tightened enough so that rings 220 and spacers 210 will not slide off pins 142.

In yet another alternative embodiment, strap 200, rings 220 and spacer 210 of the present invention do not need to be used solely with a single pin 142, but may be used as a single strap spanning a plurality of pins.

Figure 3:
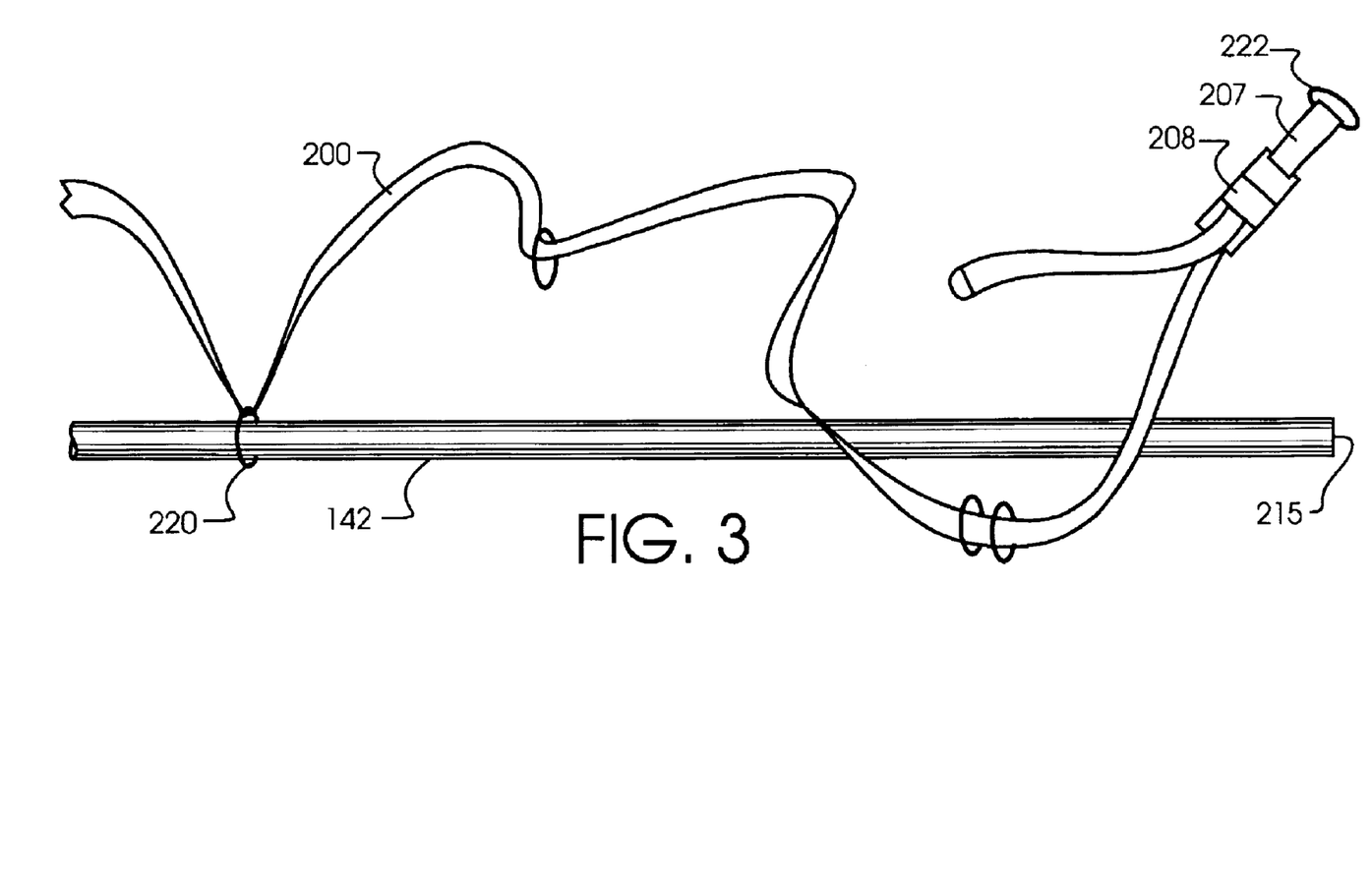
FIG. 3 illustrates the preferred embodiment cinch strap and pin of FIG. 1, designed in accord with the teachings of the present invention, from a side cut-away view.

Preferred embodiment pin 142 and strap 200 are illustrated in greater detail in FIG. 3, with the termination of pin 142 and strap 200 not illustrated. In accord with the teachings of one manifestation of the present invention, the specific attachment of anchoring of pin 142 and strap 200 is not critical to the working of the invention. In this manifestation, pin 142 and strap 200 may be anchored to any variety of supporting surfaces, including cargo carrier frames, vehicles or otherwise, and the methods of attachment thereto may include any of the myriad of techniques which are known for attaching longitudinally extensive members to a support and which would be suitable for a given application.

As described herein above, the present invention includes the application of diverse combinations of spacers 210 and rings 220. To illustrate this, FIG. 3 utilizes four rings 220 and no spacers 210, rather than the two rings 220 and one spacer 210 of FIG. 2.

As is relatively self-evident from FIG. 3, when a first ring 220 engages pin 142, thereby positioning strap 200 adjacent pin 142, a first item of cargo may be encircled. This "ready for cargo" status is illustrated in FIG. 3. In preparation for use, once a first item of cargo is placed onto pin 142, strap 200 is placed onto the cargo and a second ring 220 is slid from the open end 215 of rod 142 towards the cargo. Thus, pin 142 extends under the cargo and strap 200 will extend from adjacent pin 142 up, over and back down around cargo and back into position adjacent pin 142 at the second ring 220. This cargo encircling arrangement is illustrated and has already been described with reference to FIG. 2.

Figure 4:
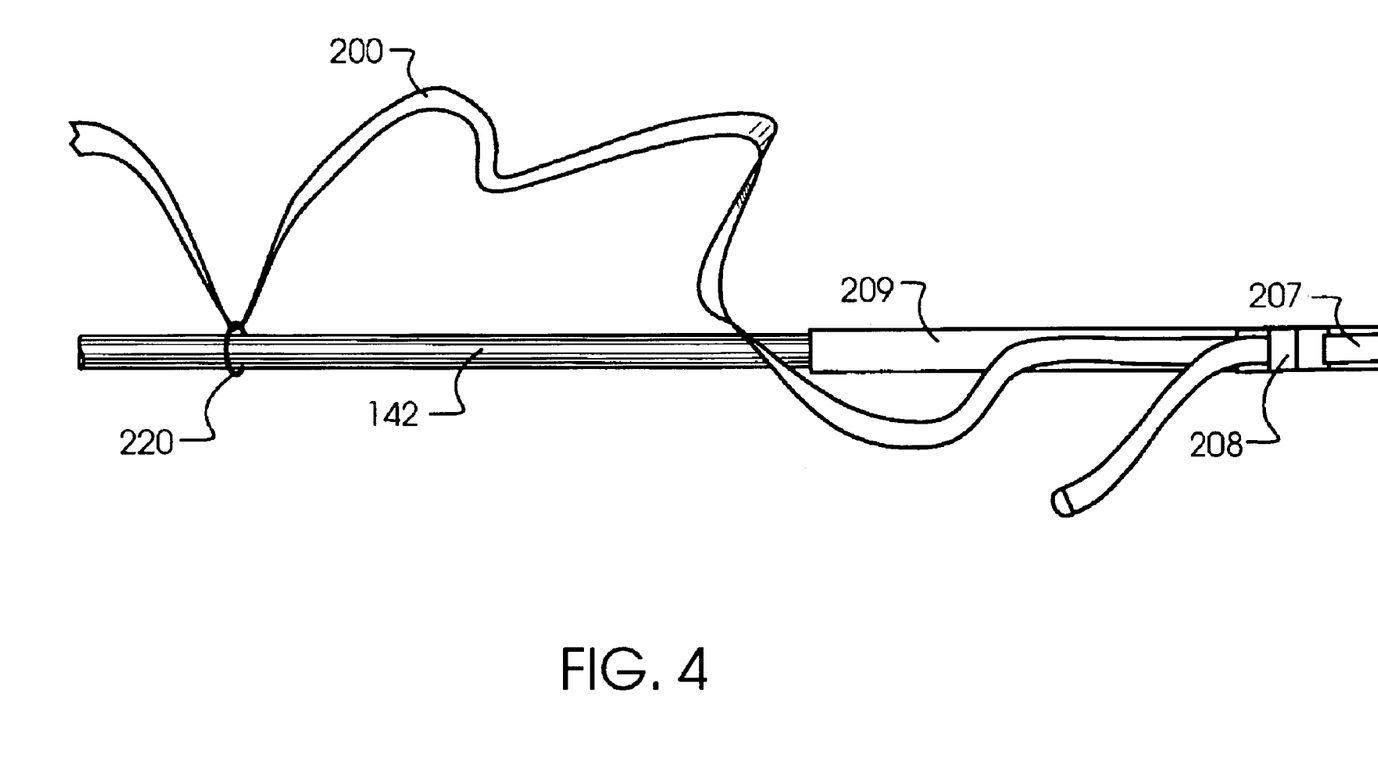
FIG. 4 illustrates an alternative support rod for use in association with the cinch strap and pin of FIG. 2 from side cut-away view.

FIG. 4 illustrates another alternative embodiment that has much utility where a light load extends farther than the longitudinal reach of pin 142. In this alternative embodiment, anchor stub 207 maybe attached directly to an extension tube 209 which slides concentrically about pin 142 and extends longitudinally farther than pin 142. Tensioning of strap 200 will draw extension tube 209 closer to the ring 220 illustrated in FIG. 4, but only to a point where the forces are balanced in the longitudinal direction on extension tube 209. Nevertheless, so long as extension tube 209 is of inside diameter approximating the outside diameter of pin 142, tube 209 can be used to extend pin 142 and carry additional load beyond the end thereof. Where only a single tricycle is to be carried, ring 220 may optionally be omitted.

Figure 5:
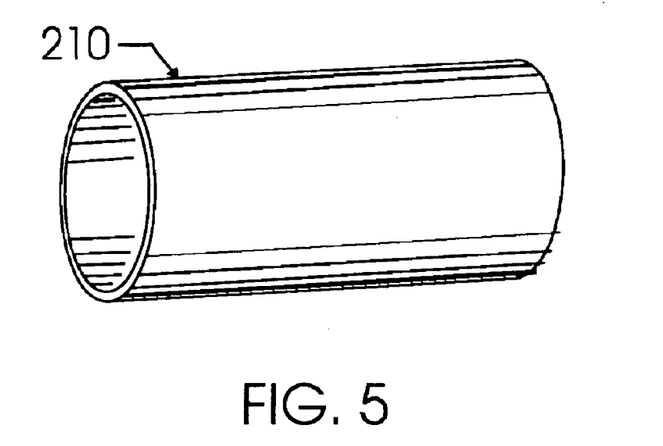
Figure 6:
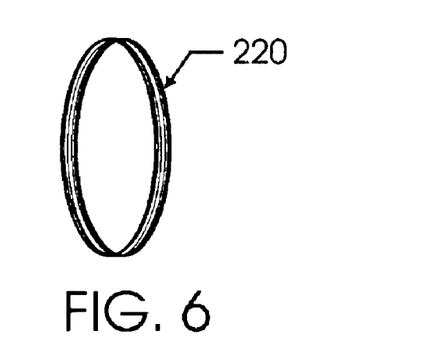
FIG. 6 illustrates a preferred ring.
Figure 7:
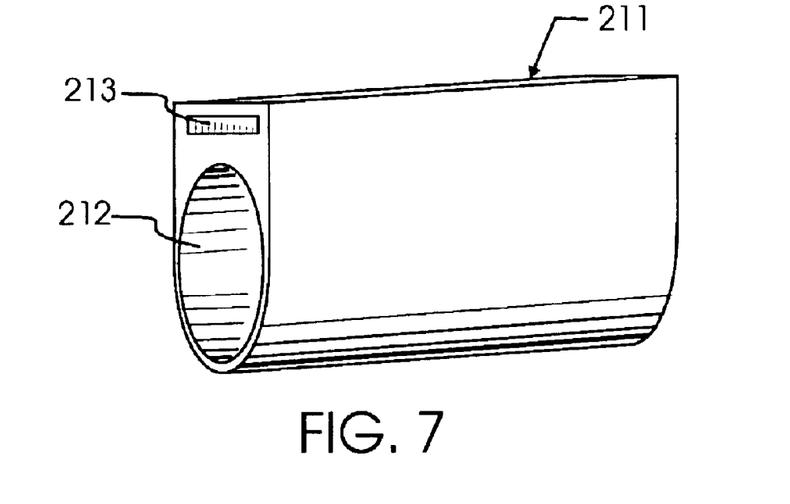
FIG. 7 illustrates one alternative embodiment spacer.

FIG. 5 illustrates a simple cylinder used as spacer 210, while FIG. 6 illustrates a simple ring used as ring 220. FIG. 7 illustrates only one of a myriad of possible alternative geometries for spacer 210. Spacer 211 illustrated therein has a bore 212 which accommodates pin 142, and also a bore or slot 213 which separately accommodates strap 200.

As the discussions herein above have shown, while the foregoing illustrates what are felt to be the preferred and some alternative embodiments of the invention, no material limitations to the scope of the claimed invention are intended. Features and design alternatives that would be obvious to one of ordinary skill in the art are considered to be incorporated herein, and could not all be individually discussed or disclosed herein. For example, in light of the present disclosure it will be apparent that features of the present invention may be used cooperatively with hitch carriers, trailers, vehicle top carriers, stationary racks, and in many other applications. However, the invention is most preferred as described herein above for use with longitudinally extensive pins that are anchored at a first longitudinal end and open at the distal end, which allows various rings and spacers to be placed which accommodated diverse cargo, and with diverse cargo which requires such adaptability. Specific materials, different arrangements of basic components illustrated herein, special coatings and other such deviations are taught by the present disclosure and deemed included herewith, even where not specifically recited. Known variations would be readily applied, by those of ordinary skill, to the present invention. The scope of the invention is set forth and particularly described in the claims hereinbelow.

I claim:

1. A cargo carrier having a structural framework operatively coupled with a vehicle towing component and having a first load support extending from said structural framework for supporting cargo during transit, wherein the improvement comprises:

a flaccid indeterminate length strap;

a buckle through which said flaccid indeterminate length strap passes and which operatively retains tension in said flaccid indeterminate length strap when said strap is operatively cinched against said supporting cargo; and a first guide coupled with and moveable relative to said first load support and also operatively coupled to said flaccid indeterminate length strap, said first guide having tensile forces applied thereto between said first load support and said indeterminate length strap when said strap is operatively cinched against said supporting cargo, said buckle affixed to said first guide.

2. The cargo carrier of claim 1 wherein said buckle is further engaged with said flaccid indeterminate length strap and operatively couples said flaccid indeterminate length strap to said first guide.

3. The cargo carrier of claim 1 wherein said load support extends from said structural framework along a longitudinal axis of said load support and said first guide moves parallel to said longitudinal axis.

4. The cargo carrier of claim 3 wherein said load support provides horizontal support for said load.

5. The cargo carrier of claim 1 wherein said flaccid indeterminate length strap has first and second ends and operatively engages said cargo between said first and second ends during transit.

6. The cargo carrier of claim 5 wherein said flaccid indeterminate length strap first end is anchored relative to said structural framework.

7. The cargo carrier of claim 1 wherein said guide comprises a ring.

8. The cargo carrier of claim 1 wherein said guide comprises a tube.

9. A cargo retainer for retaining at least one cargo item thereto, comprising:

a longitudinally extensive support surface comprising a rod and terminating in an unsupported end;

a flexible and tensionable retainer co-extensive with said longitudinally extensive support and spaced therefrom to accommodate said at least one cargo item between said flexible and tensionable retainer and said longitudinally extensive support surface;

a first means for retaining a portion of said flexible and tensionable retainer comprising a tube concentric about said rod and adjacent a portion of said longitudinally extensive support surface, said first retaining means moveable along an axis parallel to a direction of longitudinal extension of said longitudinally extensive support surface to vary the location of said portion of said longitudinally extensive support surface that is adjacent said portion of said flexible and tensionable retainer;

a second means for retaining a second portion of said flexible and tensionable retainer comprising a ring concentric about said rod and adjacent a second portion of said longitudinally extensive surface to thereby form a second space to accommodate a second cargo item, said at least one and second cargo items separated one from the other by said first retaining means, said second retaining means moveable along an axis parallel to a direction of longitudinal extension of said longitudinally extensive support surface to vary the location of said second portion of said longitudinally extensive support surface that is adjacent said second portion of said flexible and tensionable retainer.

10. A convertible cargo carrier having a generally upright member and at least one laterally extending support arm configured to support at least one diverse load, wherein the improvement comprises:

a means extending from said laterally extending support arm about said at least one diverse load and conforming generally to said at least one diverse load;

means for tensioning said extending and conforming means;

first and second alternative mounts for locating said laterally extending support arm relative to said generally upright member; and first and second alternative anchors for locating said extending and conforming means relative to said generally upright member, said first alternative anchor adjacent said first alternative mount and said second alternative anchor adjacent said second alternative mount, wherein said extending and conforming means and said laterally extending support arm may be moved as a pair relative to said generally upright member between two alternative positions.

11. The convertible cargo carrier of claim 10 wherein said tensioning means further comprises:

a means for slidably engaging said laterally extending support arm; and a releasable clip for receiving said extending and conforming means and retaining tension therein.

12. The convertible cargo carrier of claim 10 wherein said slidable engaging means further comprises a member concentric about said laterally extending support arm.

13. A cargo carrier having a structural framework operatively coupled with a vehicle towing component and having a first load support extending from said structural framework for supporting cargo during transit, wherein the improvement comprises:

a flaccid indeterminate length strap;

a buckle through which said flaccid indeterminate length strap passes and which operatively retains tension in said flaccid indeterminate length strap when said strap is operatively cinched against said supporting cargo;

a first guide coupled with and moveable relative to said first load support and also operatively coupled to said flaccid indeterminate length strap, said first guide having tensile forces applied thereto between said first load support and said indeterminate length strap when said strap is operatively cinched against said supporting cargo; and a second guide coupled with and moveable relative to said first load support and also operatively coupled to sad flaccid indeterminate length strap at a location spaced along said flaccid indeterminate length strap from said first guide sufficient to encompass said cargo about a first perimeter segment and operatively separated along said first load support from said first guide sufficient to encompass said cargo about a second perimeter segment, said second guide having tensile forces applied thereto between said first load support and said indeterminate length strap when said strap is operatively cinched against said supporting cargo, wherein said buckle is affixed to said second guide.

14. The cargo carrier of claim 13 wherein said cinching brings said first and second guides closer together along said first load support.

15. A cargo carrier having a structural framework operatively coupled with a vehicle towing component and having a first load support extending from said structural framework for supporting cargo during transit, wherein the improvement comprises:

a flaccid indeterminate length strap;

a buckle through which said flaccid indeterminate length strap passes and which operatively retains tension in said flaccid indeterminate length strap when said strap is operatively cinched against said supporting cargo;

a first guide coupled with and moveable relative to said first load support and also operatively coupled to said flaccid indeterminate length strap and said flaccid indeterminate length strap passing through said first guide, said first guide having tensile forces applied thereto between said first load support and said indeterminate length strap when said strap is operatively cinched against said supporting cargo; and a second guide coupled with and moveable relative to said first load support and also operatively coupled to said flaccid indeterminate length strap at a location spaced along said flaccid indeterminate length swap from said first guide sufficient to encompass said cargo about a first perimeter segment and operatively separated along said first load support from said first guide sufficient to encompass said cargo about a second perimeter segment, said second guide having tensile forces applied thereto between said first load support said indeterminate length strap when said strap is operatively cinched against said supporting cargo.

16. A cargo carrier having a structural framework operatively coupled with a vehicle towing component and having a first load support extending from said structural framework for supporting cargo during transit, wherein the improvement comprises:

a flaccid indeterminate length strap having first and second ends and operatively engaging said cargo between said first and second ends during transit, said flaccid indeterminate length strap first end anchored relative to said structural framework;

a buckle through which said flaccid indeterminate length strap passes and which operatively retains tension in said flaccid indeterminate length strap when said strap is operatively cinched against said supporting cargo;

a first guide coupled with and moveable relative to said first load support and also operatively coupled to said flaccid indeterminate length strap, said first guide having tensile force applied thereto between said first load support and said indeterminate length strap when said strap is operatively cinched against said supporting cargo;

first and second alternative mounts for locating said longitudinally extensive support surface relative to said structural framework; and first and second alternative anchors for locating said flaccid indeterminate length strap relative to said structural framework, said first alternative anchor adjacent said first alternative mount and said second alternative anchor adjacent said send alternative mount, wherein said flaccid indeterminate length strap and said longitudinally extensive support surface may be moved as a pair relative to said structural framework between two alternative positions.

17. A cargo corder having a structural framework operatively coupled with a vehicle towing component and having a first load support extending from said structural framework for supporting cargo during transit, wherein the improvement comprises:

a flaccid indeterminate length strap having first and second ends and operatively said cargo between said first and second ends during transit, said flaccid indeterminate length strap first end anchored relative to said structural framework;

a first guide coupled with and moveable relative to said first load support and also operatively coupled to said flaccid indeterminate length strap distal to said anchored first end of said flaccid indeterminate length strap; and a tensioner operatively applying tension between said anchored first end of said flaccid indeterminate length strap and said first guide and operatively retaining tension in said flaccid indeterminate length strap when said strap is operatively cinched against said supporting cargo, said first guide moveable towards said anchored first end of said flaccid indeterminate length strap responsive to said tension between said anchored first end of said flaccid indeterminate length strap and said first guide.

18. The cargo carrier of claim 17 wherein said flaccid indeterminate length strap is affixed adjacent said second end to said first guide.

19. The cargo carrier of claim 17 wherein said first guide fully encircles said first load support.

* * * * *